United States Patent
Abraham et al.

(10) Patent No.: US 7,642,959 B2
(45) Date of Patent: Jan. 5, 2010

(54) METHOD AND APPARATUS FOR PROCESSING SATELLITE SIGNALS AT A SATELLITE POSITIONING SYSTEM RECEIVER

(75) Inventors: Charles Abraham, Los Gatos, CA (US); Frank van Diggelen, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 0 days.

(21) Appl. No.: 11/206,623

(22) Filed: Aug. 18, 2005

(65) Prior Publication Data

US 2007/0040740 A1    Feb. 22, 2007

Related U.S. Application Data

(63) Continuation-in-part of application No. 10/394,404, filed on Mar. 21, 2003, now Pat. No. 7,190,712.

(51) Int. Cl.
G01S 1/00 (2006.01)
G01S 5/04 (2006.01)
G01S 13/00 (2006.01)

(52) U.S. Cl. .............. 342/357.12; 342/443; 342/179

(58) Field of Classification Search ............ 342/443, 342/179, 357.12
See application file for complete search history.

(56) References Cited

U.S. PATENT DOCUMENTS

| | | | | |
|---|---|---|---|---|
| 2,509,000 A * | 5/1950 | Hobson | ........ | 249/71 |
| 4,717,916 A * | 1/1988 | Adams et al. | ........ | 342/107 |
| 5,983,147 A * | 11/1999 | Krumm | ........ | 701/45 |
| 6,466,788 B1 * | 10/2002 | Carlsson | ........ | 455/435.2 |
| 6,704,348 B2 * | 3/2004 | Abraham et al. | ........ | 375/150 |
| 6,885,968 B2 * | 4/2005 | Breed et al. | ........ | 702/143 |
| 7,158,882 B2 * | 1/2007 | Abraham et al. | ........ | 701/213 |
| 7,190,712 B2 * | 3/2007 | Abraham et al. | ........ | 375/150 |
| 2002/0037028 A1 * | 3/2002 | Baltersee et al. | ........ | 375/148 |
| 2002/0133285 A1 * | 9/2002 | Hirasago | ........ | 701/96 |
| 2003/0085837 A1 * | 5/2003 | Abraham | ........ | 342/357.1 |
| 2003/0209893 A1 * | 11/2003 | Breed et al. | ........ | 280/735 |
| 2003/0219066 A1 * | 11/2003 | Abraham et al. | ........ | 375/150 |
| 2004/0039509 A1 * | 2/2004 | Breed | ........ | 701/45 |
| 2004/0130442 A1 * | 7/2004 | Breed et al. | ........ | 340/443 |
| 2004/0133927 A1 * | 7/2004 | Sternberg et al. | ........ | 725/136 |
| 2004/0190378 A1 * | 9/2004 | Farmer | ........ | 368/47 |
| 2004/0220734 A1 * | 11/2004 | Gronemeyer | ........ | 701/214 |
| 2005/0004762 A1 * | 1/2005 | Takahama et al. | ........ | 701/301 |

(Continued)

OTHER PUBLICATIONS

Wei Zhao," Internetwork Handover PerformanceppAnalysis in a GSM-Satellite Integrated Mobile Communication System", IEEE, vol. 15, No. 8, Oct. 1997, p. 1659.*

Primary Examiner—Thomas H Tarcza
Assistant Examiner—Harry Liu
(74) Attorney, Agent, or Firm—McAndrews, Held & Malloy, Ltd.

(57) ABSTRACT

Method and apparatus for processing satellite signals in an SPS receiver is described. In one example, the satellite signals are correlated against pseudorandom reference codes to produce correlation results. A determination is made whether the SPS receiver is in a motion condition or a stationary condition. The correlation results are coherently integrated in accordance with a coherent integration period. The coherent integration period is a value that depends upon the motion condition of the SPS receiver.

14 Claims, 4 Drawing Sheets

U.S. PATENT DOCUMENTS

| | | | |
|---|---|---|---|
| 2005/0125117 A1* | 6/2005 | Breed | 701/29 |
| 2005/0131607 A1* | 6/2005 | Breed | 701/45 |
| 2005/0148346 A1* | 7/2005 | Maloney et al. | 455/456.6 |
| 2005/0163201 A1* | 7/2005 | Krasner | 375/150 |
| 2005/0179579 A1* | 8/2005 | Pinder et al. | 342/25 R |
| 2005/0192745 A1* | 9/2005 | Abraham et al. | 701/213 |
| 2006/0034350 A1* | 2/2006 | Nielsen | 375/147 |
| 2006/0046719 A1* | 3/2006 | Holtschneider | 455/434 |
| 2006/0114984 A1* | 6/2006 | Gaal et al. | 375/240 |
| 2006/0167595 A1* | 7/2006 | Breed et al. | 701/1 |
| 2006/0208169 A1* | 9/2006 | Breed et al. | 250/221 |

\* cited by examiner

METHOD AND APPARATUS FOR PROCESSING SATELLITE SIGNALS AT A SATELLITE POSITIONING SYSTEM RECEIVER

This application claims priority to, and is a continuation-in-part of U.S. application Ser. No. 10/394,404 filed Mar. 21, 2003 that issued as U.S. Pat. No. 7,190,712 on Mar. 13, 2007.

BACKGROUND OF THE INVENTION

1. Field of the Invention

The present invention generally relates to satellite position location systems and, more particularly, to a method and apparatus for processing satellite signals at a satellite positioning system receiver.

2. Description of the Related Art

Satellite Positioning System (SPS) receivers use measurements from several satellites to compute position. SPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. Exemplary satellite positioning systems include the Global Positioning System (GPS), the European GALILEO system, and the Russian GLONASS system.

In GPS, each signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

The process of measuring GPS signal begins with a procedure to search for the GPS signal in the presence of noise by attempting a series of correlations of the incoming signal against a PN reference code. The search process can be lengthy, as both the exact frequency of the signal and the time-of-arrival delay are unknown. To find the signal, receivers traditionally conduct a two dimensional search, checking each delay possibility at every possible frequency. To test for the presence of a signal at a particular frequency and delay, the receiver is tuned to the frequency, and the incoming signal is correlated with the known PRN code delayed by an amount corresponding to the time of arrival. If no signal is detected, the search continues to the next delay possibility, and after all delay possibilities are checked, continues to the next frequency possibility. Each individual correlation is performed over one or more milliseconds in order to allow sufficient signal averaging to distinguish the signal from the noise. This process is referred to as integration, which may include both coherent integration and non-coherent integration (magnitude integration).

The time delays are used to determine "sub-millisecond pseudoranges," since they are known modulo the 1 millisecond PN frame boundaries. By resolving the integer number of milliseconds associated with each delay to each satellite, then one has true, unambiguous, pseudoranges. A set of four pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS system time") associated with the satellite signal. The GPS system time information is in the form of a second of the week signal, referred to as time-of-week (TOW). This absolute time signal allows the receiver to unambiguously determine a time tag for when each received signal was transmitted by each satellite.

In some GPS applications, the signal strengths of the satellite signals are so low that it is desirable to increase the length of the coherent integration period during signal measurement. However, the frequency response of the coherent integration process narrows as the coherent integration period is increased. As such, the effectiveness of lengthening the coherent integration period is limited by the degree to which the frequency is unknown. Accordingly, there exists a need in the art for a method and apparatus for processing satellite signals at an SPS receiver capable of dynamically adjusting the coherent integration period.

SUMMARY OF THE INVENTION

Method and apparatus for processing satellite signals in an SPS receiver is described. In one embodiment, the satellite signals are correlated against pseudorandom reference codes to produce correlation results. A determination is made whether the SPS receiver is in a motion condition or a stationary condition. The correlation results are coherently integrated in accordance with a coherent integration period. The coherent integration period has a value that depends upon a motion condition of the SPS receiver.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

A method and apparatus for processing satellite positioning system (SPS) signals is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing SPS satellite signals.

Figure 1:
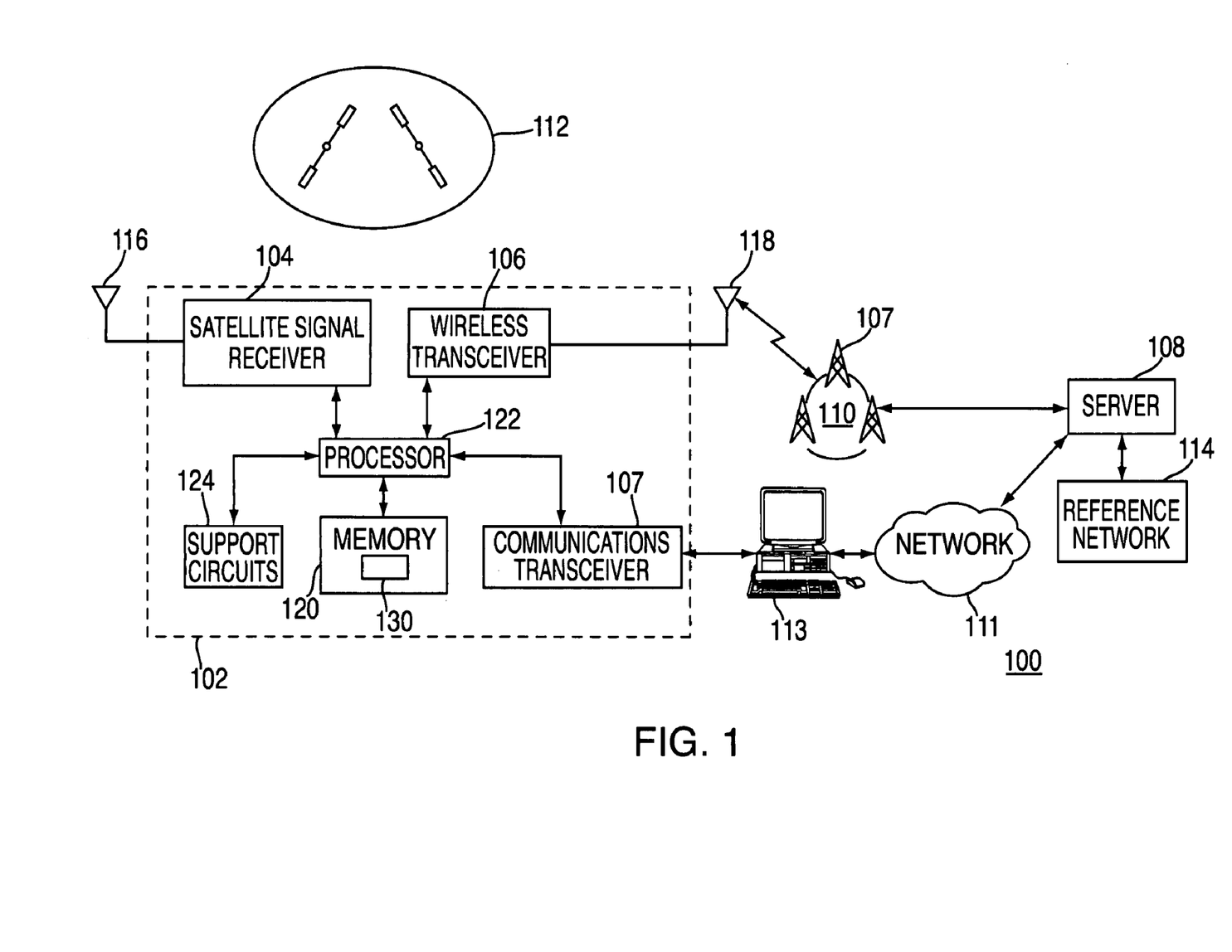
FIG. 1 is a block diagram depicting an exemplary embodiment of a position location system.

FIG. 1 is a block diagram depicting an exemplary embodiment of a position location system 100. The system 100 comprises a remote receiver 102 and a server 108. The remote receiver 102 is configured to receive satellite signals from a plurality of satellites 112 in a constellation of satellites. The remote receiver 102 processes the received signals to produce satellite measurement data (e.g., pseudoranges, range-rate measurements) with respect to the satellites 112. In one embodiment, the remote receiver 102 receives assistance data from the server 108. The remote receiver 102 may communicate with the server 108 via a wireless network 110, a wired network 111, or both. Notably, the remote receiver 102 may be configured for direct communication with the wired network 111 or for indirect communication through a computer 113. The wireless network 110 may comprise any type of wireless network known in the art, such as a cellular telephone network. The wired network 111 may comprise any type of wired network known in the art, such as the Internet.

The remote receiver 102 may use the assistance data to aid in acquisition of the satellite signals and/or to compute position. The assistance data may include satellite position information (e.g., ephemeris data or other type of satellite orbit model), expected code phase, expected Doppler, a pseudorange model, and like type assistance data known in the art, as well as any combination of such data. In one embodiment, the remote receiver 102 computes its own position using the satellite measurement data and the assistance data. Such a configuration is similar to the industry standard "Mobile Station Based" mode. In another embodiment, the remote receiver 102 sends the satellite measurement data to the server 108 and the server 108 computes position of the remote receiver. Such a configuration is similar to the industry standard "Mobile Station Assisted" mode.

Although the position location system 100 is shown as an Assisted GPS (A-GPS) system having a server, it is to be understood that the remote receiver 102 may operate autonomously without receiving assistance data from the server 108. That is, in another embodiment, there is no communication between the remote receiver 102 and the server 108 and the remote receiver 102 does not receive assistance data. Instead, the remote receiver 102 receives satellite position information by decoding the satellite signals to recover satellite navigation data using a well known decoding process. The remote receiver 102 then computes its own position using the satellite measurement data and the satellite navigation data.

In one embodiment, the remote receiver 102 comprises a satellite signal receiver 104, a wireless transceiver 106, a processor 122, support circuits 124, a communications transceiver 107, and a memory 120. The satellite signal receiver 104 receives satellite signals from the satellites 112 using an antenna 116. The satellite signal receiver 104 may comprise a conventional A-GPS receiver. An exemplary GPS receiver is described below with respect to FIG. 2. The wireless transceiver 106 receives wireless signals from the wireless communication network 110 via an antenna 118. The communications transceiver 107 may comprise a modem or the like for direct communication with the wired network 111, or may comprise a serial transceiver or the like for communicating with the computer 113.

Although the remote receiver 102 is shown as having both a wireless transceiver and a communications transceiver, those skilled in the art will appreciate that the remote receiver 102 may be configured with only the wireless transceiver 106 or only the communications transceiver 107. The satellite signal receiver 104, the wireless transceiver 106, and the communications transceiver 107 may be controlled by the processor 122. For purposes of clarity by example, the remote receiver 102 is shown as an assisted-SPS receiver. Those skilled in the art will appreciate, however, that the invention described herein may be used in a conventional autonomous SPS receiver (e.g., a receiver without a wireless transceiver or a communications transceiver).

The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disc storage, or any combination of such memory devices. Various processes and methods described herein may be implemented via software stored in the memory 120 for execution by the processor 122. Alternatively, such processes and methods may be implemented using dedicated hardware, such as an application specific integrated circuit (ASIC), or a combination of hardware and software. The support circuits 124 include conventional cache, power supplies, clock circuits, data registers, I/O circuitry, and the like to facilitate operation of the remote receiver 102.

The remote receiver 102 is configured with a motion detection module. The motion detection module detects whether the remote receiver 102 is in a motion condition or a stationary condition. As discussed below, the coherent integration period used by the satellite signal receiver 104 may be adjusted based on whether the remote receiver 102 is moving, i.e., in a motion condition or a stationary condition.

In one embodiment, the motion detection module is implemented using motion detection software 130 stored in the memory 120. Notably, the motion detection software 130 is configured to detect motion of the remote receiver 102 using information from a wireless signal received by the wireless transceiver 106, such as timing advance values, as discussed below.

In one embodiment, the wireless communication network 110 may be a time division multiple access (TDMA) network, such as a global systems for mobile communications (GSM) networks, universal mobile telecommunications system (UMTS) networks, North American TDMA networks (e.g., IS-136), and personal digital cellular (PDC) networks. The remote receiver 102 may determine its state of motion using timing advance data provided by a base station 107 of the network 110.

Notably, TDMA communication systems compensate for the effect of propagation delays by synchronizing the arrival of transmissions from variously located mobile receivers to the slotted frame structures used by base stations. In order to synchronize transmissions from mobile receivers located in a base station service area, the base station typically transmits a timing advance (TA) value to each mobile receiver. A given mobile receiver advances its transmissions to the base station according to the TA value to compensate for the propagation delay between the mobile receiver and the base station. Typically, the TA values instruct the mobile receivers to advance their uplink transmissions such that the transmissions from all the mobile receivers served by a base station arrive at the base station in synchronism with a common receive frame structure.

For example, TDMA systems may utilize a random access channel (RACH) to receive an access request burst from an unsynchronized mobile receiver and use propagation delay gained from the receive RACH burst to determine an appropriate TA value for the mobile receiver. Upon start-up, or handoff to a new base station, an unsynchronized mobile receiver searches for and receives a control channel (e.g., common control channel (CCCH) in a GSM system) from the base station that provides an initial timing reference. To initiate use of the base station, the mobile receiver then transmits a RACH burst at a predetermined time in relation to the control channel timing reference. Upon receipt of the RACH burst, the base station can determine round-trip time delay based on the delay between transmission of the control channel timing reference and receipt of the RACH burst. The base station uses this round-trip time delay to determine an appropriate TA value for the remote receiver.

For example, in a GSM system, once a connection has been established between a remote receiver and a base station, the base station continues to measure the time offset between its own burst schedule and bursts received from the mobile receiver. Based on these measurements, the base station periodically provides the remote receiver with timing advance information in the form of a 6-bit TA value transmitted on the slow associated control channel (SACCH) at a rate of twice per second. The base station estimates round-trip delay on the RACH, and uses this estimated round-trip delay to determine the appropriate TA value to send to the mobile receiver. Typically the TA value sent by the base station corresponds to the absolute delay between the base station and the mobile receiver in terms of the number of bit periods. In GSM, the 6-bit TA value provides a range of from 0 bit periods to 63 bit periods of advance, with a resolution of 1 bit period. Timing advance mechanisms for other types of TDMA systems (e.g., IS-136, PDC, and UMTS) are similar to that of GSM and are well-known in the art.

TA data received from the base station 107 may be used to determine whether the remote receiver 102 is in a motion condition or a stationary condition. For example, by monitoring TA values received from the base station 107 over the time period, a determination may be made as to whether the remote receiver 102 is in a stationary condition. If the change in the TA values over the time period is below a predefined threshold, the remote receiver 102 is deemed to be in a stationary condition. For example, the difference between the maximum TA value and the minimum TA value received over the time period may be compared to a pre-defined threshold around zero to determine whether or not the remote receiver 102 is in the stationary condition. In a GSM system, for example, the threshold may be defined with respect to a particular number of bit-periods (e.g., ±x bit-periods of change between the maximum and minimum TA values). If the remote receiver 102 is not in the stationary condition, the remote receiver 102 is deemed to be in the motion condition.

In another embodiment, the motion detection module comprises a motion measurement device 150. The motion measurement device 150 may comprise an accelerometer, a speedometer, and like-type motion measurement and motion detection devices known in the art. In such embodiments, a threshold may be established to delineate whether the remote receiver 102 is in a stationary condition or motion condition in accordance with a given metric associated with the motion measurement device 150.

Satellite navigation data, such as ephemeris for at least the satellites 112, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 108.

Figure 2:
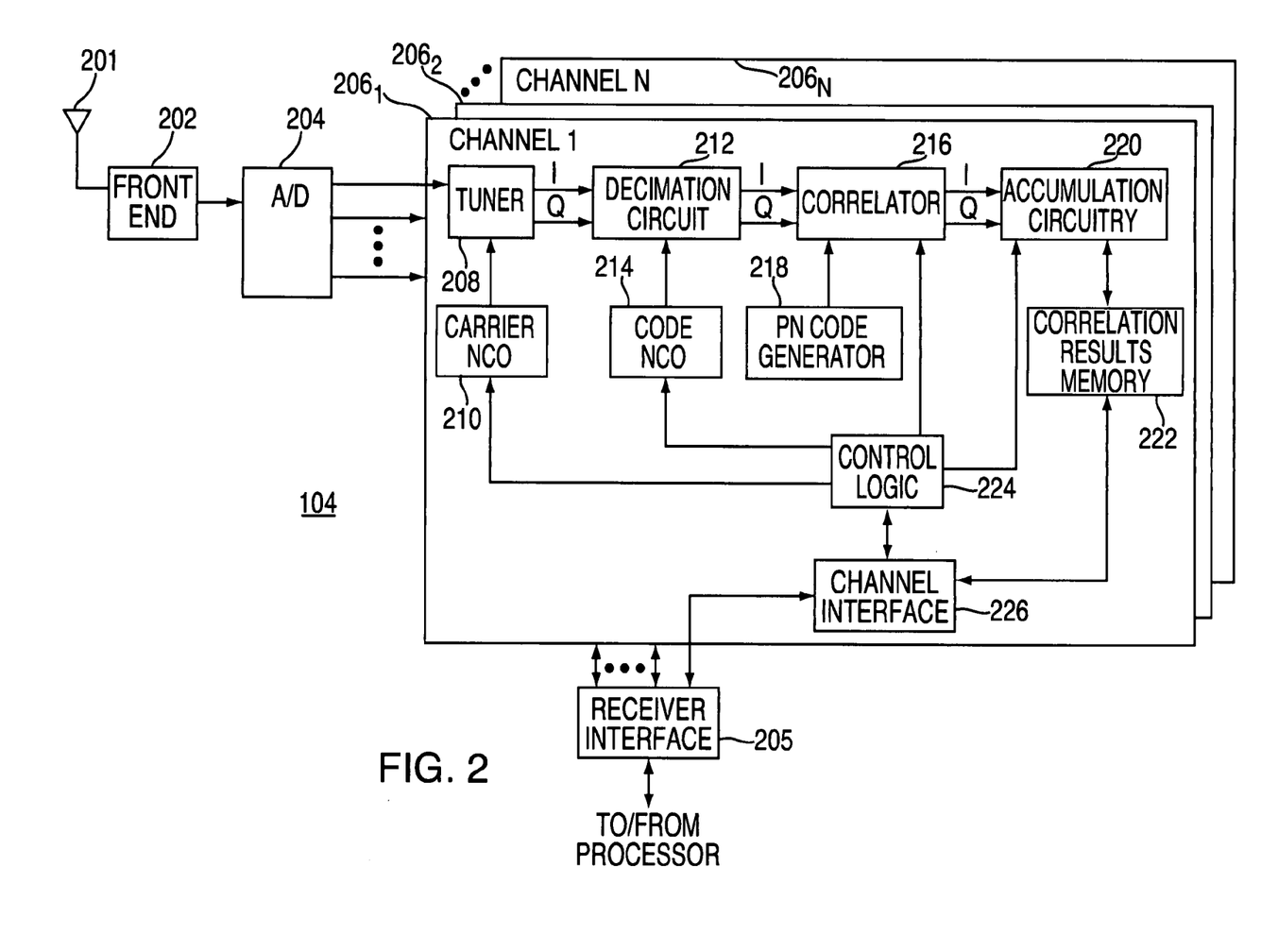
FIG. 2 is a block diagram depicting an exemplary embodiment of a satellite signal receiver of FIG. 1.

FIG. 2 is a block diagram depicting an exemplary embodiment of the satellite signal receiver 104 of FIG. 1. The satellite signal receiver 104 illustratively comprises a front end 202, an analog-to-digital converter 204, a receiver interface 205, and a set of processing channels $206_1$ through $206_N$ (collectively referred to as processing channels 206), where N is an integer. For purposes of clarity by example, only the processing channel $206_1$ is shown in detail. Those skilled in the art will appreciate that the processing channels $206_2$ through $206_N$ are identical to the processing channel $206_1$.

GPS signals are received by an antenna 201. The front end 202 filters, amplifies, and frequency shifts the GPS signals in a well-known manner for digitization by the A/D converter 204. Outputs of the AND converter 204 are respectively coupled to each of the processing channels 206. The receiver interface 205 includes a bus configured to communicate with external circuitry (e.g., the processor 122), and a bus configured to communicate with each of the processing channels 206.

Each of the processing channels 206 comprises a tuner 208, a carrier numerically controlled oscillator (NCO) 210, a decimation circuit 212, a code NCO 214, a correlator 216, a PN code generator 218, accumulation circuitry 220, correlation results memory 222, control logic 224, and channel interface logic 226. The accumulation circuitry 200 and the correlation results memory 222 comprise integration circuits for the receiver 104. Each of the processing channels 206 may be used to process a signal from a particular satellite. The tuner 208 is driven by the carrier NCO 210 to digitally tune a particular satellite signal. The tuner 208 may serve two purposes. First, the tuner 208 may remove any intermediate frequency component remaining after processing by the front end 202. Second, the tuner 208 may compensate for any frequency shift resulting from satellite motion, user motion, and reference frequency errors. The tuner 208 outputs baseband signal data comprises an in-phase component (I) and a quadrature component (Q).

The decimation circuit 212 processes the I and Q data from the tuner 208 to produce a series of complex signal samples with I and Q components in accordance with a sampling rate determined by the code NCO 214. In general, the sampling rate of the decimation circuit 212 may be selected to produce m samples per chip of the satellite signal PN code, where m is an integer greater than zero. In this manner, the satellite signal receiver 104 may operate in multiple modes of resolution. For example, in a standard resolution mode, the decimation circuit 212 may produce digital signal samples have two samples per PN code chip (i.e., the samples are spaced at ½ of a PN code chip). In a high-resolution mode, the decimation circuit 212 may produce digital signal samples having five samples per PN code chip (i.e., the samples are spaced at ⅕ of a PN code chip). Those skilled in the art will appreciate that other values for the sample spacing may be employed and that the GPS receiver 104 may operate in more than two modes of resolution.

The correlator 216 processes the I and Q samples from the decimation circuit 212. The correlator 216 correlates the I and Q signals with an appropriate PN code generated by the PN code generator 218 for the particular satellite signal. The I and Q correlation results are accumulated with other I and Q correlation results by the accumulation circuitry 220 and are stored in the correlation results memory 222. The accumulation process is referred to as signal integration and is used to improve signal-to-noise ratio of the correlation results. Notably, the accumulation circuitry 220 may accumulate I and Q correlation results for a time period associated with one or more epochs of the PN code. For example, the I and Q correlation results may be accumulated over a one millisecond interval (i.e., one PN code epoch) or over a multiple millisecond interval (e.g., 10 PN code epochs or 10 milliseconds). This process is referred to as coherent integration and the associated time period is referred to as a coherent integration interval.

The carrier NCO 210, the code NCO 214, the correlator 216, and the accumulation circuitry 220 are controlled by the control logic 224. Notably, the control logic 224 may implement the desired mode of resolution (e.g., standard resolution mode or high-resolution mode) through control of the code NCO 214, as well as set the coherent integration period. The control logic 224 may receive configuration data for the processing channel $206_1$ from the channel interface 226. The channel interface 226 may receive the configuration data from the receiver interface 205. In addition, the channel interface 226 provides an interface for the processing channel $206_1$ to the correlation results memory 222. For a detailed understanding of the GPS receiver 104 and the components discussed above, the reader is referred to commonly-assigned U.S. Pat. No. 6,704,348, issued Mar. 9, 2004, which is incorporated by reference herein in its entirety.

Figure 3:
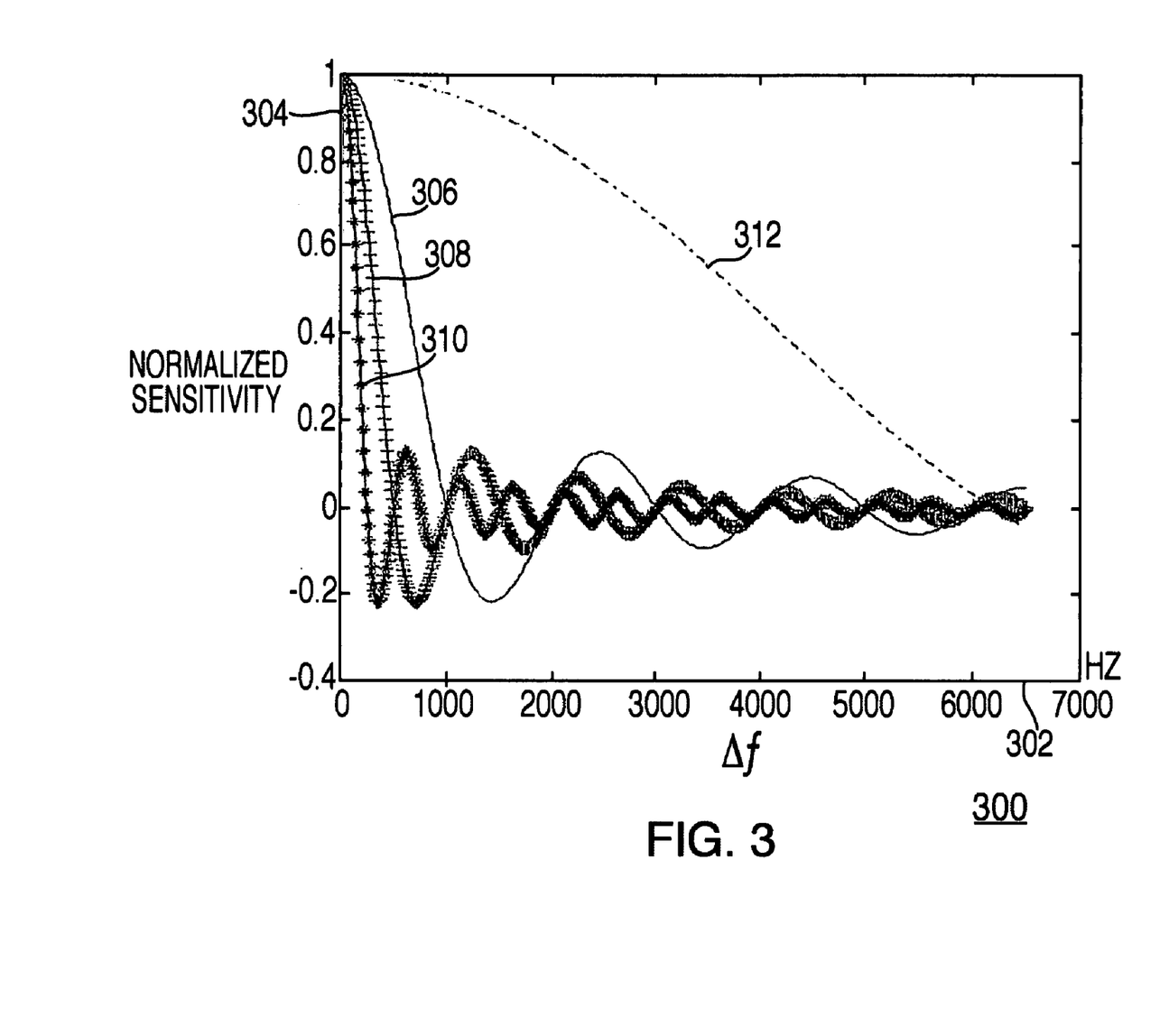
FIG. 3 depicts a graph showing exemplary frequency response waveforms for various coherent integration periods.

FIG. 3 depicts a graph 300 showing exemplary frequency response waveforms for various coherent integration periods. The graph 300 includes an axis 302 representing the deviation of frequency in the received signals from an expected frequency, and an axis 304 representing the normalized sensitivity of the correlation and coherent integration process. In general, the frequency response is a sinc function having a first null (first zero) at a frequency of 1/T, where T is the coherent integration period. Frequency responses for coherent integration periods of 1 millisecond, 2 milliseconds, and 4 milliseconds are depicted by waveforms 306, 308, and 310, respectively. As is apparent from the waveforms 306, 308, and 310, the frequency response of the correlation and coherent integration process narrows as the coherent integration period is increased.

The frequency of the received signals may deviate from the expected frequency due to: (a) Doppler associated with the satellites, which is typically less than ±4 kHz; (b) Doppler associated with the motion of the remote receiver 102, which is typically less than several hundred Hz; and (c) frequency errors associated with the reference oscillator of the remote receiver 102, which can range from hundreds of Hz to tens of kHz, depending on the quality of the reference oscillator employed in the receiver 100. In an assisted SPS system, aiding data may be supplied to the remote receiver 102 that provides an accurate estimate of the Doppler in the received signal. As such, a-priori knowledge of the Doppler is known, longer coherent integration periods may be used without a loss in sensitivity due to the roll-off of the frequency response. That is, the remote receiver 102 compensates for the Doppler in the received signal, which results in the signal frequency remaining near the peak of the frequency response.

In some cases, the remote receiver 102 may not have a-priori knowledge of the Doppler in the received signal. For example, the remote receiver 102 may be operating in an autonomous mode, where no aiding information is provided to the remote receiver 102. Uncompensated Doppler in the received signal limits the duration for coherent integration due to the frequency roll-off described above. This is apparent from the waveforms 306, 308, and 310, which show that the sensitivity of the correlation and coherent integration process is substantially reduced as the frequency error increases. For example, given a coherent integration period of 4 ms (the waveform 308), the sensitivity is reduced by one half when there is a frequency error of approximately 150 Hz.

Figure 4:
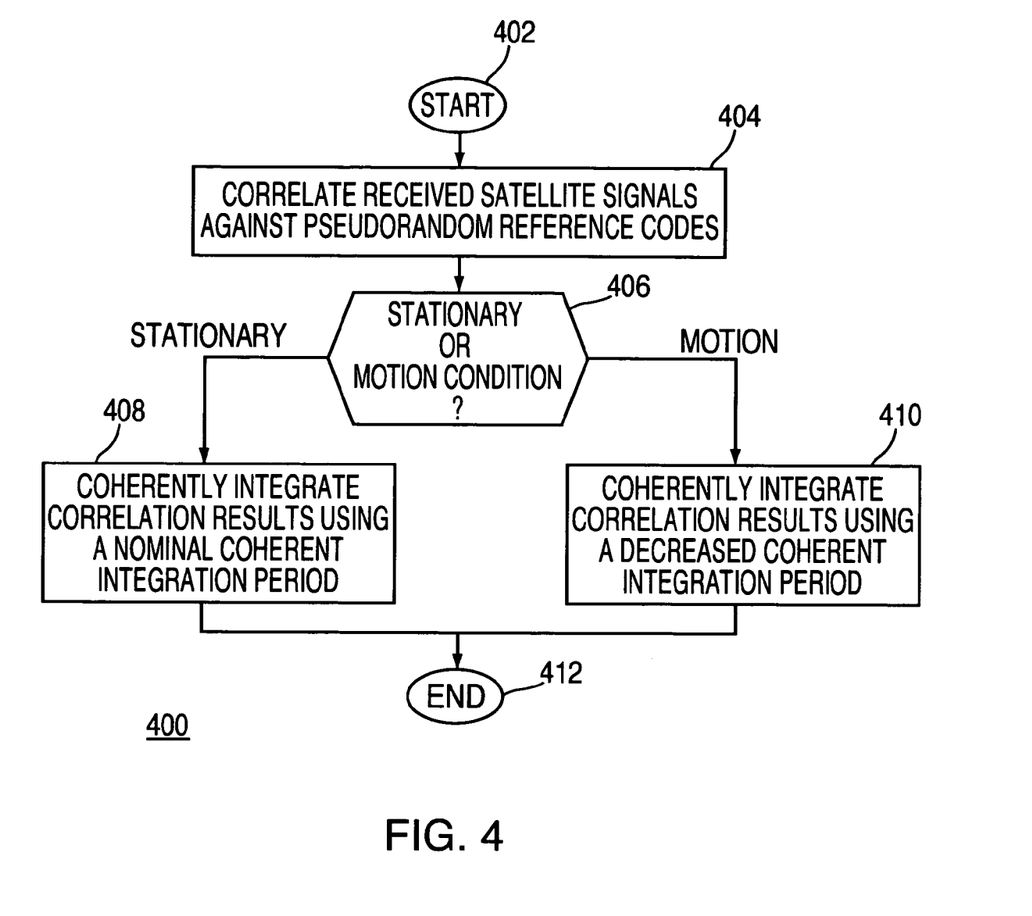
FIG. 4 is a flow diagram depicting an exemplary embodiment of a method of processing satellite signals in accordance with one or more aspects of the invention.

In accordance with one aspect of the invention, if the remote receiver 102 is in a motion condition, the coherent integration period is reduced to compensate for the potential error in frequency. FIG. 4 is a flow diagram depicting an exemplary embodiment 400 of a method of processing satellite signals in accordance with one or more aspects of the invention. The method 400 begins at step 402. At step 404, received satellite signals are correlated against pseudorandom reference codes to produce correlation results. At step 406, a determination is made whether the remote receiver is in a stationary condition or a motion condition. Detection of the motion condition or the stationary condition may be employed using TA values from the wireless network 110, or information from the motion measurement device 150.

If the remote receiver is in the stationary condition, the method 400 proceeds to step 408. At step 408, the correlation results are coherently integrated using a nominal coherent integration period. In one embodiment, the nominal coherent integration period is more than one epoch of the GPS signal. For example, the correlation results may be coherently integrated between 10 and 20 milliseconds.

If the remote receiver is in the motion condition, the method 400 proceeds to step 410. At step 410, the correlation results are coherently integrated using a coherent integration period less than the nominal period. In one embodiment, the decreased coherent integration period is less than one epoch of the GPS signal ("sub-epoch" coherent integration). An exemplary process for sub-epoch coherent integration is described in commonly-assigned U.S. published patent application no. 2003/0219066, published Nov. 27, 2003, which is incorporated by reference herein in its entirety. In one embodiment, the value of the decreased coherent integration period may be determined dynamically based on the motion condition. For example, the decreased coherent integration period may be selected from several different values based on the speed of the remote receiver 102. The method 400 ends at step 412.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system.

While the foregoing is directed to illustrative embodiments of the present invention, other and further embodiments of the invention may be devised without departing from the basic scope thereof, and the scope thereof is determined by the claims that follow.

The invention claimed is:

1. A signal processing method for processing satellite signals in a satellite positioning system (SPS) receiver, comprising:
    correlating the satellite signals against pseudorandom reference codes to produce correlation results;
    detecting whether the SPS receiver is in a motion condition or a stationary condition;
    coherently integrating the correlation results in accordance with a coherent integration period, where a value of the coherent integration period depends on the movement of the SPS receiver; and
    wherein the coherent integration period being a first value if the SPS receiver is in the stationary condition, or a second value if the SPS receiver is in the motion condition, wherein the second value of the coherent integration period is less than the epoch of the pseudorandom code, wherein the first value is larger than the second value.

2. The signal processing method of claim 1, wherein the detecting step comprises:
    monitoring information received from a wireless communication network at the SPS receiver.

3. The signal processing method of claim 2, wherein the information comprises a plurality of timing advance values obtained at a respective plurality of times.

4. The signal processing method of claim 1, wherein the detecting step comprises:
    monitoring information generated by a motion measurement device.

5. The signal processing method of claim 1, wherein the satellite signals are global positioning system (GPS) signals, and wherein the first value of the coherent integration period is greater than an epoch of a pseudorandom code.

6. The signal processing method of claim 1, wherein the second value is selected from a plurality of values based on a magnitude of the motion condition.

7. A signal processing apparatus for processing satellite signals in a satellite positioning system (SPS) receiver, comprising:
    a correlator for correlating the satellite signals against pseudorandom reference codes to produce correlation results;
    a motion detection module for detecting whether the SPS receiver is in a motion condition or a stationary condition;
    integration circuits for coherently integrating the correlation results in accordance with a coherent integration period; and
    control logic for setting the coherent integration period to a value that depends on the movement of the SPS receiver, wherein the motion detection module is configured to compute a difference between a maximum of a plurality of timing advance values and a minimum of the plurality of timing advance values, where the stationary condition is detected in response to the difference being less than a predetermined threshold, and the motion condition is detected in response to the difference being more than the predetermined threshold.

8. The signal processing apparatus of claim 7 wherein the coherent integration period value comprises:
    a first value if the SPS receiver is in the stationary condition, or a second value if the SPS receiver is in the motion condition, the second value being less than the first value.

9. The signal processing apparatus of claim 7, further comprising:
    a wireless transceiver for receiving a wireless signal from a wireless communication network;
    wherein the motion detection module is configured to monitor information in the wireless signal.

10. The signal processing apparatus of claim 8, wherein the information comprises a plurality of timing advance values obtained at a respective plurality of times.

11. The signal processing apparatus of claim 7, wherein the motion detection module comprises a motion measurement device.

12. The signal processing apparatus of claim 8, wherein the satellite signals are global positioning system (GPS) signals, and wherein the first value of the coherent integration period is greater than an epoch of a pseudorandom code.

13. The signal processing apparatus of claim 12, wherein the second value of the coherent integration period is less than the epoch of the pseudorandom code.

14. The signal processing apparatus of claim 8, wherein the control logic selects the second value from a plurality of values based on a magnitude of the motion condition.

* * * * *